Jan. 21, 1964 P. N. NELSON 3,118,402
WEED KILLER TOOL
Filed Dec. 6, 1962

INVENTOR.
PERMIL N. NELSON
BY Threedy & Threedy
HIS ATTORNEYS.

United States Patent Office 3,118,402
Patented Jan. 21, 1964

3,118,402
WEED KILLER TOOL
Permil N. Nelson, Galesburg, Ill., assignor to Lynn H. Ewing, doing business as Blackhawk Company, Rock Island, Ill.
Filed Dec. 6, 1962, Ser. No. 242,724
1 Claim. (Cl. 111—7.1)

My invention relates to new and useful improvements in a weed killer tool, particularly a tool for injecting in the ground beneath the surface thereof a solution for killing or destroying weeds.

My invention has for one of its several objects the provision of a probe tube which is adapted to be driven or pressed into the ground under the weight of the operator, to a position where a valve-actuated member is caused to operate by engagement with the ground surface to open a valve for the passage of a weed-killing or destroying solution through the probe into the ground beneath the surface thereof.

Yet another object of the invention is the provision in a device of the character hereinafter described of a simple arrangement for automatically closing the valve of the device when the probe tube is withdrawn from projection into the ground.

Other objects will appear hereinafter.

The invention consists in the novel combination and arrangement of parts to be hereinafter described and claimed.

The invention will be best understood by reference to the accompanying drawings showing the preferred form of construction, and in which.

Figures 1, 2:
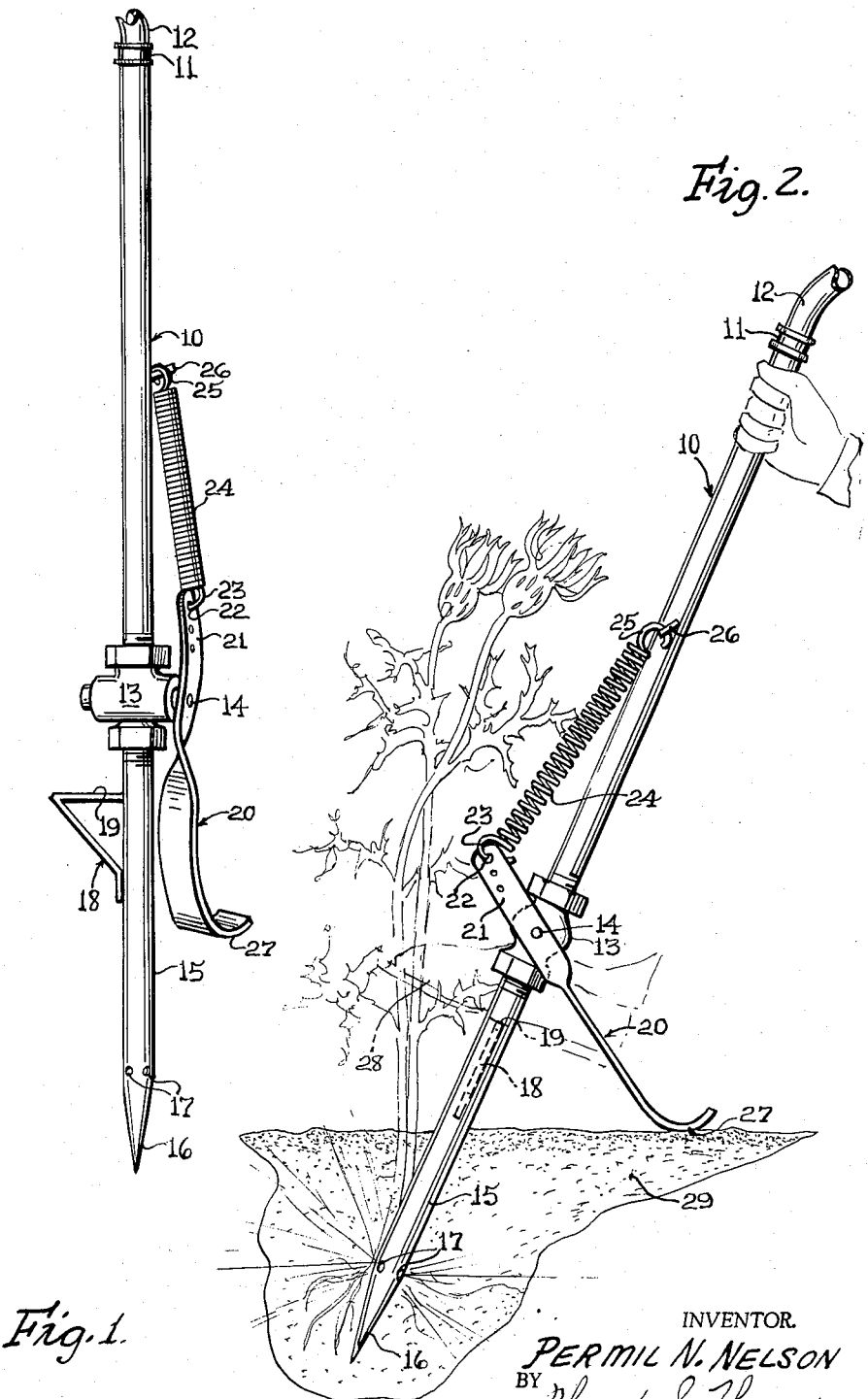
FIG. 1 is a perspective view of the invention.
FIG. 2 is an elevational view of the invention showing the same in position to discharge a weed killing solution into the ground.

The several objects of my invention are preferably accomplished by the preferred form of construction shown in the drawings. Such construction includes a tubular handle 10 having a coupling connection 11 to a flexible supply hose 12 leading to a supply of weed killing solution. The handle 10 is threadable or otherwise connected to a conventional valve 13 having a rotatable valve actuating shaft 14. Threadably or otherwise connected to this valve 13 is a probe tube 15 having a pointed end 16 perforated radially as at 17.

Secured to the upper end portion of the probe tube 15 is a step 18 having a horizontal portion 19. Fixedly mounted on the valve shaft 14 at a point intermediate its opposite end portions is a bar 20. The end portion 21 is provided with an opening 22 to facilitate connecting the end portion 23 of a spring 24, the opposite end portion 25 being connected to a hook element 26 secured to the handle 10. The opposite end 27 of the bar 20 is curved upwardly to provide a toe which, when it engages the surface of the ground, will not penetrate into the ground but will act to rotate the shaft 14 a sufficient distance against the action of the spring 24 to open the valve 13.

In use, the user or operator firmly grasps the handle 10 with his hands and places one foot 28 upon the horizontal portion 19 of the step 18 so as to dispose his entire weight or so much of his weight upon the step as will drive the probe tube 15 into the ground 29. In this movement of the probe tube 15, the toe 27 of the bar 20 will bear upon the surface of the ground and be caused to pivot as the probe tube 15 moves into the ground and thereby rotate the shaft 14 to open the valve 13 to permit the flow of weed killing solution into the ground through the perforations 17.

Upon extracting the probe tube 15 from projection into the ground, the spring 26, being expanded, will cause the bar 20 to pivot in a clockwise direction as viewed in FIG. 2, to a position closing the valve 13.

The weed killing solution may be of any well-known type, such as now commercially in use, and may be delivered under pressure through the flexible supply hose 12 to the handle 10 for passage into and through the probe tube 15 when the valve 13 is opened in the manner hereinbefore set forth.

From the foregoing description it will be apparent that the device of this invention is of a relatively simple nature and will be effective for delivering weed killing solution to the area beneath the surface of the ground where it will be most effective.

While I have illustrated and described the preferred form of construction for carrying my invention into effect, this is capable of variation and modification without departing from the spirit of the invention. I therefore do not wish to be limited to the precise details of construction set forth, but desire to avail myself of such variations and modifications as come within the scope of the appended claim.

Having thus described my invention, what I claim as new and desire to protect by Letters Patent is:

A device of the class described comprising
(a) a tubular elongated handle,
(b) a supply hose connected to one end of said handle for supplying a weed killing solution to said handle,
(c) a valve having a rotatable shaft connected to the opposite end of the handle,
(d) a probe tube connected to said valve and having a pointed end portion perforated radially,
(e) a step secured to said probe tube to receive the weight of a person holding said handle so as to drive said tube into the ground,
(f) a bar fixedly secured to said shaft at a point intermediate its opposite end portions and normally extending longitudinally with respect to the handle,
(g) a spring connected to one end portion of said bar and to said handle for yieldably holding said bar in valve closing position,
(h) the opposite end portion of said bar having an upwardly curved toe normally disposed between said valve and said pointed end portion of said probe tube and adapted to engage the ground to pivot said bar in valve opening direction after said probe tube is driven into the ground a predetermined depth in any direction, said spring acting on said bar to pivot said bar in said valve closing direction when said probe tube is withdrawn from said ground.

References Cited in the file of this patent
UNITED STATES PATENTS

| | | |
|---|---|---|
| 823,272 | Halpin | June 12, 1906 |
| 947,906 | Hall | Feb. 1, 1910 |
| 1,807,695 | Lee | June 2, 1931 |
| 1,856,809 | Gibson | May 3, 1932 |
| 2,157,915 | Olson | May 9, 1939 |
| 2,390,686 | Bishop | Dec. 11, 1945 |
| 2,718,856 | Gathercoal | Sept. 27, 1955 |

FOREIGN PATENTS

| | | |
|---|---|---|
| 30,635 | France | Apr. 20, 1926 |

(Addition to No. 584,917)